United States Patent Office 3,580,898
Patented May 25, 1971

3,580,898
VAPOR PHASE POLYMERIZATION OF BUTENE-1
Milton K. Rosen, Flemington, and Charles D. Mason, Florham Park, N.J., assignors to Allied Chemical Corporation, New York, N.Y.
No Drawing. Filed May 28, 1968, Ser. No. 732,528
Int. Cl. C08f 1/42, 3/12
U.S. Cl. 260—93.7                                   10 Claims

ABSTRACT OF THE DISCLOSURE

Vapor phase polymerization of butene-1 using Ziegler-Natta stereoregulating catalyst with diethyl aluminum chloride as co-catalyst. Maintaining initial temperature less than about 26° C. affords powder or granular poly(butene-1) resin of high isotacticity, suitable for powder molding. After initial phase of polymerization (when sufficient polymer has been formed to fill at least about 10% of the reactor volume), temperature and pressure can be raised in order to increase reaction rate without causing agglomeration of product. Molecular weight of poly(butene-1) is controlled without affecting granularity by supplying hydrogen into the reaction medium.

BACKGROUND OF THE INVENTION

This invention relates to a process for the polymerization of butene-1, and in particular to the vapor phase polymerization thereof to afford an isotactic, powdered resin.

Butene-1 can be polymerized directly to high molecular weight isotactic polymers by the use of steroregulating catalyst, for example by the procedures of Natta et al. U.S. Pat. 3,014,016 and Mostardini et al. Canadian Pat. 652,510. These stereoregular polymers are referred to as isotactic polymers, where the degree of isotactivity is that percent of the material which is insoluble after exhaustive extraction with diethyl ether.

The stereoregulating catalyst which affords these isotactic polymers, commonly known as a Zeigler-Natta type catalyst, is a two-component system comprising a transition metal compound and a metal-alkyl compound.

The transition metal compound used in preparing the catalyst may be, for instance, a halide of titanium, zirconium, hafnium, thorium, vanadium, tantalum, niobium, chromium, molybdenum, tungsten or uranium, in which the metal has the lower valence. The metals listed are transition metals belonging to Groups IV to VI inclusive of the Mendeleeff Periodic Table.

The transition metal compound is a solid, crystalline compound of the metal in which the metal has a valence lower than the maximum valence corresponding to its position in the Periodic Table. The preferred compound is titanium trichloride in its various crystalline forms.

The metal-alkyl compound of use in the art comprises an alkyl or monohaloalkyl compound of a metal of the 1st to 3rd columns of the Periodic Table, i.e., lithium from the 1st column, beryllium, magnesium, zinc, and other metals of the second group, and aluminum, gallium, and other elements of the third group.

The valencies of the aforesaid metal of the 1st to 3rd column of the Periodic Table are linked to the same or different alkyl radicals, e.g., ethyl, propyl, and butyl radicals. One valence of the metal may be satisfied by halogen. Typical metal-alkyls include triethyl aluminum, monochlorodiethyl aluminum, diethyl zinc etc.

The stereoregulating catalysts are readily prepared by conventional procedures provided in the art.

The use of a solvent or liquefied monomer in the polymerization reaction is disadvantageous for economic reasons and for reasons of convenience. However, unlike polyethylene and polypropylene, attempts to prepare isotactic poly(butene-1) by vapor phase reaction have heretofore resulted in the product being formed as a solid mass of resin which is difficult to remove from the reactor and to process. Often the material has had to be ground or milled in order to obtain a form which could be easily fabricated into final products. In addition, polymers of very high isotacticity could not be obtained by vapor phase polymerization.

SUMMARY OF THE INVENTION

It has now been found that butene-1 can be polymerized in the vapor phase to afford a powdered or granular product of very high isotacticity by limiting the initial reaction temperature to about 26° C. or less in conjunction with the use of diethylaluminum chloride as co-catalyst with a stereoregulating transition metal halide. These reaction conditions afford a powdered material which requires no further processing to render it suitable for powder molding and other fabricating procedures.

DETAILED DESCRIPTION OF THE INVENTION

The instant invention provides an improved vapor phase process for the polymerization of butene-1 wherein the selection of catalyst and reaction conditions is critical for the purpose of providing a granular product of very high isotacticity.

In conducting the vapor phase polymerization according to the instant invention, it is necessary that the metal-alkyl co-catalyst be diethylaluminum chloride (DEAC) in order to obtain the poly(butene-1) in granulated form. It has been found that co-catalysts such as triethyl aluminum result in agglomeration of the product and a decreased isotacticity; therefore, the selection of co-catalyst is critical and not a matter of choice if a granular or powdered polymer is desired.

Initial reaction temperature is also critical in the instant invention, in that initial temperatures in excess of about 26° C. also result in agglomeration of the products. By limiting the initial reaction temperature to less than about 26° C., preferably between about 20° C. and 25° C., while using DEAC co-catalyst, a finely divided poly(butene-1) of greater than about 95% isotacticity is obtained.

It has been found that this critical temperature requirement is necessary only during the initial phase of the polymerization. After sufficient poly(butene-1) has been formed at the initial temperature to fill at least approximately 5–10% of the volume of the reactor, the temperature can be raised substantially without causing agglomeration of the product. It is only during the first step of polymerization that low temperature is critical. Subsequent temperatures of at least about 30° C. are preferable to accelerate the reaction, and temperatures as high as 45–50° C. and even higher could be used if desired. However, if the reaction temperature is raised before an adequate amount of poly(butene-1) has been formed, even to only about 30° C., agglomeration will result.

Inasmuch as the instant process is a vapor phase polymerization, the poly(butene-1) should be charged into the reaction vessel at a pressure low enough to avoid the presence of liquid monomer in the vessel. Furthermore, it is preferred that pressures of 5–33 p.s.i.g., more preferably 18–22 p.s.i.g., be used during the initial part of the reaction to improve the granularity of the product. When the temperature is increased after the initial phase of the reaction in order to increase the rate, the pressure might also be increased to 55–60 p.s.i.g. or even higher for the same purpose. Preferably, the pressure will be raised to at least about 40 p.s.i.g. By maintaining the butene-1 pressure at desired levels, an adequate supply of monomer is constantly being fed into the reaction medium.

In connection with pressure of butene-1, it has been found that the initial temperature restriction to less than about 26° C. is critical even when the initial butene-1 pressure is reduced substantially, for example to about 10 p.s.i.g.

In conducting the instant process, it is customary to purge the rotary reaction vessel repeatedly with nitrogen until trace amounts of oxygen and water are removed. Part of the DEAC is then added in a small volume of liquid aliphatic hydrocarbon, and the reactor is rotated for additional period to remove any moisture, after which time a suspension of the transition metal compound, which is preferably titanium trichloride in its various crystalline forms, and DEAC, is added. Although any liquid aliphatic hydrocarbon might be used as the carrier for the catalyst, such as pentane, hexane and isoctane, it has been found unexpectedly that pentane affords a preferred polymer with better granularity. When the volume of pentane is equal to about 0.003% of the reactor volume, it need not be removed prior to the polymerization. Only when the liquid represents a more substantial portion of the reactor volume does it have to be removed.

The polymerization reaction can be continued as long as desired or up to the capacity of the reactor; specifically, it may be conducted for a period ranging from a few hours to several days. When the reaction is to be terminated, the unreacted butene-1 is vented, the reactor is purged with nitrogen and steam is added to deactivate the catalyst.

The instant process affords a poly(butene-1) in a fine powdery state with viscosity average molecular weights in the range of about 2–3 million and isotacticities greater than about 95%. The use of hydrogen gas in the reaction vessel in a manner taught by the art will serve to control the high molecular weights obtained by this process. For example, hydrogen pressure of 15 p.s.i.g. during the reaction will lower the molecular weight to about 180,000 without affecting granularity of isotacticity.

Particle size of this poly(butene-1) is sufficiently small to be suitable for powder molding procedures without any further grinding as has been necessary heretofore. Thus, when blow molding, injection molding, and other fabricating procedures are unsuitable or not preferred, powder molding with poly(butene-1) obtained by the instant invention can be used to great advantage.

Various reaction parameters other than temperature can be adjusted to vary the particle size of the resulting poly(butene-1). With the reactor rotating at 3 r.p.m., commercial titanium trichloride (AA—average particle size about 150 microns) affords a polymer with 62% of the particles larger than 8 mesh; reducing the average particle size of the titanium trichloride to less than 50 microns results in only 50% of the polymer particles being larger than 8 mesh. By increasing the rate of rotation to 10 r.p.m. in conjunction with the commercial titanium trichloride (AA), only 17% of the polymer particles are larger than 8 mesh.

The following examples are provided to more fully illustrate the instant invention. They are provided for illustrative purposes only and are not to be construed as limiting the instant invention, which is defined by the appended claims.

Example I

A 4' x 10' reactor, reactor, arranged for rotation about its major axis, was purged several times with nitrogen to remove oxygen and water. The nitrogen is then flushed out with butene-1. One half pound of DEAC in one gallon of pentane was added to the reactor which was then rotated with the charge for 30 minutes, after which time a suspension of 2.0 pounds DEAC and 1.0 pound titanium trichloride (violet) in 6.0 gallons of pentane was added. Hydrogen was supplied to the reactor at a pressure of 2.0 p.s.i.g. and butene-1 was supplied to bring the total pressure to 35 p.s.i.g. The temperature was maintained at 24° C. while the reactor was rotated at 3 r.p.m. Temperature and pressure were raised as indicated at the following times: at 24 hours, 30° C. and 45 p.s.i.g.; at 49 hours, 35° C. and 50 p.s.i.g.; at 93 hours, 40° C. and 55 p.s.i.g.

After 156 hours, the pressure was released, the butene-1 was purged with nitrogen and steam was added to deactivate the catalyst. The poly(butene-1) was a fine powder of which 67.5% had a particle size of 44–300 microns, viscosity average molecular weight of 500,000 and 97.3% isotacticity.

Examples II–IV

The procedure of Example I was repeated with the following modifications to afford the indicated poly(butene-1) products:

|  | II | III | IV |
|---|---|---|---|
| Charge: | | | |
| TiCl₃, lbs | 1.0 | 1.0 | 1.0 |
| DEAC | 1.5 | 2.5 | 2.5 |
| Pentane, gal | 5.0 | 7.0 | 7.0 |
| Hydrogen, p.s.i | | | 15 |
| Phase I: | | | |
| Temp., °C | 25 | 23 | 24 |
| Max. pressure, p.s.i | 25 | 30 | 40 |
| Time, hrs | 24 | 32 | 27 |
| Phase II: | | | |
| Temp., °C | | 30 | 30 |
| Max. pressure, p.s.i | | 35 | 56 |
| Time, hrs | | 47 | 22 |
| Phase III: | | | |
| Temp., °C | | 35 | 35 |
| Max. pressure, p.s.i | | 37 | 60 |
| Time, hrs | | 40 | 44 |
| Phase IV: | | | |
| Temp., °C | | 40 | 40 |
| Max. pressure, p.s.i | | 45 | 62 |
| Time, hrs | | 68 | 66 |
| Total yield, lb | 50 | 685 | 1,000 |
| Mol. wt. × $10^{-6}$ | 2.1 | 4.5 | 6.1 |
| Isotacticity, percent | 95 | 98 | 95 |
| Particle size, wt. percent: | | | |
| >1,000μ | 1.8 | 22.0 | 11.8 |
| 1,000–300μ | 8.9 | 18.5 | 24.5 |
| 300–44μ | 89.3 | 59.5 | 63.7 |

Example V

The poly(butene-1) as produced in Example I is blended into the following formulation to afford a stabilized resin:

Ingredient: Parts by weight
Poly(butene-1) _____ 100
Zinc stearate _____ 0.05
2-ethylhexyl diphenyl phosphite _____ 0.15
1,1,3-tris(2-methyl-4-hydroxy-5-t-butylphenyl) butane _____ 0.15
Distearyl dithiopropionate _____ 0.20

A pipe compound is prepared by blending 97.5 parts of the stabilized resin with 2.5 parts of carbon black (16 millimicrons particle diameter channel black).

What is claimed is:

1. In a process for preparing isotactic poly(butene-1) in powder or granular form which comprises the vapor phase polymerization of butene-1 catalyzed by a stereo-regulating catalyst comprising a solid, crystalline Group IV to VI transition metal halide, said transition metal having a valence lower than its maximum valence and a metal-alkyl co-catalyst, the improvement which comprises using diethylaluminum chloride as the co-catalyst, initiating the polymerization at a reaction temperature less than about 26° C. and maintaining the polymerization at such reaction temperature until the amount of poly(butene-1) formed equals at least 10% of the volume of the reactor.

2. A process according to claim 1, wherein the initial reaction temperature is between about 20° C. and 25° C.

3. A process according to claim 1, wherein the improvement additionally comprises increasing the reaction temperature to greater than about 30° C. after the poly(butene-1) product equals at least about 10% of the volume of the reaction vessel.

4. A process according to claim 1, wherein the improvement additionally comprises initiating the polymerization at a pressure between about 5 p.s.i.g. and 33 p.s.i.g.

5. A process according to claim 1, wherein the improvement additionally comprises using pentane as a carrier for the catalyst.

6. A process according to claim 1, wherein the improvement additionally comprises using titanium trichloride of average particle size less than about 50 microns as the transition metal halide.

7. A process for preparing isotactic poly(butene-1) in powder or granular form, said isotactic poly(butene-1) having an isotactic content of at least 95%, which process comprises polymerizing butene-1 in the vapor phase in the presence of a catalyst comprising titanium trichloride and diethylaluminum chloride, said polymerization being initiated at a reaction temperature between about 20° C. and 25° C. and maintained at such temperature until the amount of poly(butene-1) formed equals at least 10% of the volume of the reactor.

8. The process of claim 7 wherein the polymerization is initiated at a pressure between about 5 p.s.i.g. and 33 p.s.i.g.

9. The process of claim 8 wherein pentane is used as a carrier for the catalyst.

10. The process of claim 9 wherein the average particle size of the titanium trichloride is less than about 50 microns.

References Cited

UNITED STATES PATENTS

| | | | |
|---|---|---|---|
| 2,860,127 | 11/1958 | Banks | 260—94.9 |
| 3,014,016 | 12/1961 | Natta et al. | 260—93.7 |
| 3,288,720 | 11/1966 | Moretti et al. | 252—429 |
| 3,300,457 | 1/1967 | Schmid et al. | 260—88.2 |

JOSEPH L. SCHAFER, Primary Examiner

E. J. SMITH, Assistant Examiner

U.S. Cl. X.R.

260—45.7, 45.85, 45.95